United States Patent [19]

Howe

[11] Patent Number: 4,965,444
[45] Date of Patent: Oct. 23, 1990

[54] AUTOMATIC GAIN CONTROL FIBER OPTICA-TO-ELECTRICAL TRANSCEIVER

[75] Inventor: Varce E. Howe, Zionsville, Ind.

[73] Assignee: Ransburg Corporation, Indianapolis, Ind.

[21] Appl. No.: 233,164

[22] Filed: Aug. 17, 1988

[51] Int. Cl.$^5$ .............................................. G01V 1/32
[52] U.S. Cl. ................................. 250/205; 250/227.11
[58] Field of Search ..................... 250/201, 205, 227; 358/128, 60, 231, 341; 372/25, 26, 29, 31; 340/784, 794

[56] References Cited

U.S. PATENT DOCUMENTS

| | | |
|---|---|---|
| 3,323,120 | 5/1967 | Uehlin et al. |
| 3,364,359 | 1/1968 | Cronin |
| 3,419,727 | 12/1968 | Pabst |
| 3,778,791 | 12/1973 | Lewicki et al. |
| 3,796,866 | 3/1974 | McClellan |
| 3,898,583 | 8/1975 | Shuey |
| 3,986,022 | 10/1976 | Hyatt |
| 4,160,165 | 7/1979 | McCombs et al. |
| 4,162,398 | 7/1979 | Kayanuma |
| 4,172,994 | 10/1979 | Berkvist |
| 4,195,291 | 3/1980 | Burks, Jr. |
| 4,204,115 | 5/1980 | Boldridge, Jr. |
| 4,260,882 | 4/1981 | Barnes |
| 4,271,355 | 6/1981 | Wisner et al. |
| 4,277,755 | 7/1981 | Fausone et al. |
| 4,342,906 | 8/1982 | Hyatt |
| 4,443,695 | 4/1984 | Kitamura |
| 4,443,696 | 4/1984 | Taboada |
| 4,449,043 | 5/1984 | Husbands |
| 4,471,385 | 9/1984 | Hyatt |
| 4,507,767 | 3/1985 | Takasugi |
| 4,645,919 | 2/1987 | McCaleb ................... 250/205 |
| 4,672,457 | 6/1987 | Hyatt |
| 4,678,900 | 7/1987 | Nishioka |
| 4,707,838 | 11/1987 | Reule et al. |
| 4,733,398 | 3/1988 | Shibagaki et al. |
| 4,769,532 | 9/1988 | Kawakami ................... 250/205 |

FOREIGN PATENT DOCUMENTS

| | | |
|---|---|---|
| 2410809 | 6/1979 | France. |
| 1182396 | 2/1970 | United Kingdom. |
| 2010537 | 6/1979 | United Kingdom. |
| 2068150 | 8/1981 | United Kingdom. |
| 2068152 | 8/1981 | United Kingdom. |

OTHER PUBLICATIONS

"Optoelectronics Finds Applications in Motor-Speed Control Through Use of a Phototachometer", *Control and Instrumentation*, Oct. 1972, p. 19.

*Primary Examiner*—David C. Nelms
*Attorney, Agent, or Firm*—Barnes & Thornburg

[57] ABSTRACT

A light source is responsive to an input electrical signal to increase or decrease its output depending upon whether the input electrical signal corresponds to a higher light output level than the source is currently providing or a lower light output level than the source is currently providing, respectively. The output control comprises a light detector for monitoring the light output and for producing a signal related thereto, a voltage source for establishing a maximum desired light output, a voltage source for establishing a minimum desired light output, and a window comparator for comparing the detected signal to the maximum and minimum desired light outputs. The light detector and voltage sources are coupled to the window comparator. A binary counter selectively generates a periodic signal. An OR gate couples the window comparator to the binary counter. A D/A converter and light source driver couple the binary counter to the light source. The binary counter provides the periodic signal as the input electrical signal to the light source in response to the window comparator determining that the light detector signal is not related to a light output between the maximum desired light output and the minimum desired light output.

13 Claims, 3 Drawing Sheets

AUTOMATIC GAIN CONTROL FIBER OPTICA-TO-ELECTRICAL TRANSCEIVER

This invention relates to closed-loop light output controls. It is described in the context of a remote motor speed control but it is believed that the invention has utility in other fields as well.

Remote motor speed controls are known. There are, for example, the systems illustrated in British Patent Specification Nos. 2,068,150 and 2,068,152 and references cited therein. Many systems such as these rely upon optical waveguides, or fiber optical cables, to isolate the motor being controlled from the control system. This is frequently done, for example, because the motors are in hazardous or deleterious environments or because considerable electrostatic potentials are being maintained between the motors and the control systems. For example, in the situation in which a motor is driving a rotary electrostatic atomizer, the motor may be maintained at a potential with respect to ground of $-100$ KV or more. It is necessary to keep this potential on the motor and off the remaining components of the motor control system while still permitting the free passage of motor speed-related information back to the control system. Fiber optic cables are one technique which can easily be implemented to achieve these ends. The cables permit speed related information to be passed to the speed control equipment as light pulses. At the same time, their insulating capabilities do not degrade the potential which is being maintained across the motor to ground.

There are some problems associated with implementing a control system involving fiber optic cables. First, cables vary substantially from each other in their overall transmission characteristics so that broad variation can occur when one fiber cable is replaced by another. Replacement is not uncommon in situations where, for example, cables flex. Fibers can become broken, reducing the overall transmittance of the cable. Thus, the amount of light being transmitted is reduced and may be reduced to a point at which the presence of a light pulse, necessary to determine motor speed, cannot be detected. In addition, the finishes polished on the ends of fiber optic cables are not completely uniform. Thus a highly polished tip essentially at right angles to the sidewall of a fiber optic cable can transmit a high proportion of the original light intensity. A poorly polished tip, or one which is not at right angles, gives rise to internal reflections and coupling losses in intensity of light transferred.

Further, there can be considerable variation in gain in the detectors into which the ends of fiber optic cables are plugged, and with which these cables must interface. The unpredictability of loop gains makes the control of motor speed even more difficult.

According to the invention, an output control is provided for a light source. The light source is responsive to an input electrical signal to increase or decrease its output depending upon whether the input electrical signal corresponds to a higher light output level than the source is currently providing or a lower light output level than the source is currently providing, respectively. The gain control comprises first means for monitoring the light output and for producing a signal related thereto. Second means establishes a maximum desired light output. Third means establishes a minimum desired light output. Fourth means compares the first means signal to the maximum and minimum desired light outputs. Means couple the first, second, and third means to the fourth means. Fifth means selectively generates a periodic signal. Means couples the fourth means to the fifth means. Means couples the fifth means to the light source. The fifth means provides the periodic signal as the input electrical signal to the light source in response to the fourth means determining that the first means signal is not related to a light output between the maximum desired light output and the minimum desired light output.

Illustratively, according to an embodiment of the invention, the apparatus further comprises a motor, an element rotated by the motor, means for coupling light from the light source to the element, and means for coupling signals from the element to the first means. The signals coupled from the element to the first means are related to the rate of rotation of the element.

According to this embodiment of the invention, the element comprises a rotor rotated by the motor. The rotor has a specular region and a non-specular region. The means for coupling light from the light source to the element comprises a first optical waveguide having a first end positioned adjacent the light source for receiving light output therefrom and a second end positioned adjacent the element. The means for coupling signals from the element to the first means comprises a second optical waveguide having a first end positioned adjacent the element and a second end positioned adjacent the first means.

According to an illustrative embodiment of the invention, the first means comprises a light detector. Illustratively according to this embodiment, the first means further comprises an amplifier comprising an input. The light detector has an output, and means couples the light detector output to the amplifier input. Additionally illustratively according to this embodiment, the first means further comprises an integrator having an input. The amplifier has an output, and means couple the amplifier output to the integrator input.

Illustratively according to this embodiment, the fourth means comprises a first comparator having two inputs. The means for coupling the second means to the fourth means comprises means for coupling the second means to one input of the first comparator. The integrator has an output. The means for coupling the first means to the fourth means comprises means for coupling the output of the integrator to the other input of the first comparator.

Additionally illustratively according to this embodiment, the fourth means comprises a second comparator having two inputs. The means for coupling the third means to the fourth means comprises means for coupling the third means to one input of the second comparator. The means for coupling the first means to the fourth means further comprises means for coupling the output of the integrator to the other input of the second comparator.

Further illustratively according to this embodiment, each of the first and second comparators comprises an output. The fifth means comprises an OR gate having two inputs. The means for coupling the fourth means to the fifth means comprises means for coupling the first comparator output to one of the inputs of the OR gate and the second comparator output to the other of the inputs of the OR gate.

Further illustratively according to this embodiment, the fifth means further comprises a time base generator having an output, a counter having an input, an output, and a disabling terminal, and a digital-to-analog (D/A) converter having an input and an output. The OR gate includes an output. Means couples the output of the OR gate to the disabling terminal of the counter. Means couples the output of the time base generator to the input of the counter. Means couples the output of the counter to the input of the D/A converter. The means for coupling the fifth means to the light source comprises means for coupling the output of the D/A converter to the light source.

Further illustratively according to this embodiment, the fifth means further comprises a light source driver having an input and an output. The means for coupling the output of the D/A converter to the light source comprises means for coupling the output of the D/A converter to the input of the light source driver. The light source driver provides the input electrical signal to the light source. The means for coupling the fifth means to the light source comprises means for coupling the output of the light source driver to the light source.

The invention may best be understood by referring to the following description and accompanying drawings which illustrate the invention. In the drawings.

Figure 1:
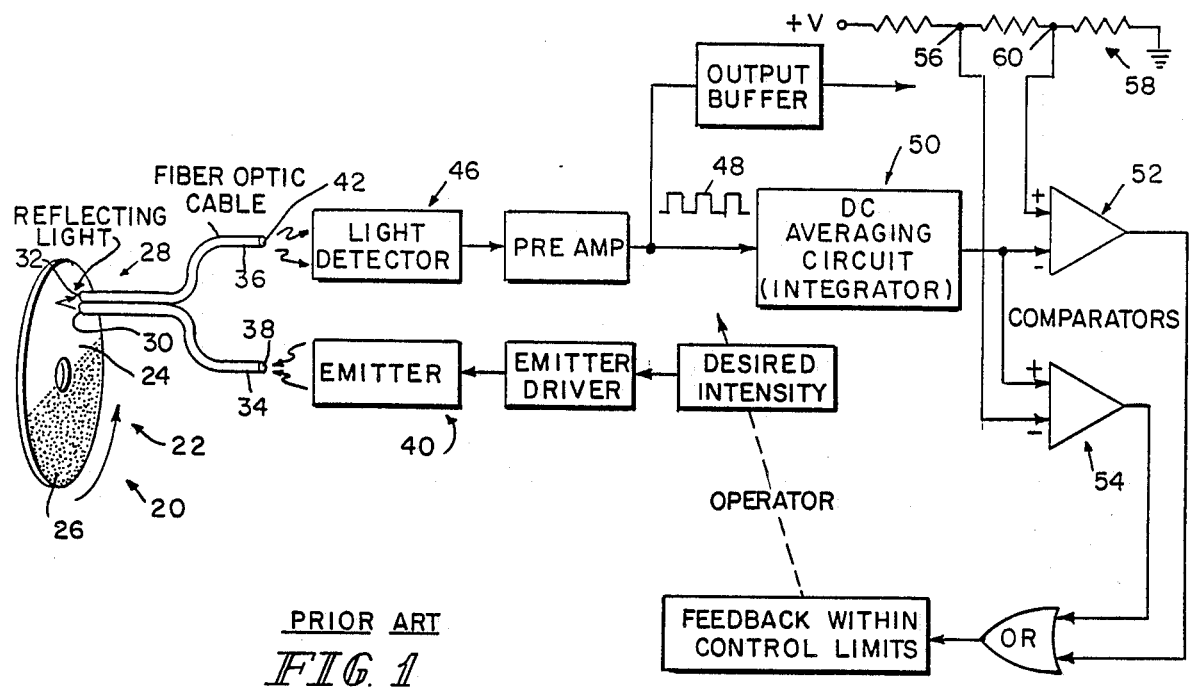
FIG. 1 illustrates a block diagram of a prior art intensity control system.

Referring to FIG. 1, a rotary atomizer motor of the type illustrated in British Patent Specification Nos. 2,068,150 or 2,068,152 includes a rotary element 20, such as a turbine wheel, one surface 22 of which is provided with a specular segment 24 and a non-specular segment 26. As the element 20 is rotated by the motor, the specular and non-specular elements 24, 26 are alternately presented before a fiber optic cable head 28 which includes an end 30, 32 of each of two fiber optic cables 34, 36, respectively. Cable 34 extends from its other end 38 adjacent a variable intensity light emitter 40 to its end 30, transmitting light from emitter 40 to surface 22. Cable 36 extends from end 32 to its other end 42 adjacent a light detector 46. Cable 36 transmits pulses back to light detector 46 when specular segment 24 is beneath head 28. When non-specular segment 26 is beneath head 28, of course, no light pulses are transmitted back. The light detector 46 converts these light pulses into an electrical pulse train 48 which is further processed as discussed in British Patent Specification Nos. 2,068,150 and 2,068,152 to provide closed-loop control of the motor speed.

An integrator 50 functions as a DC averaging circuit, receiving the electrical pulse train 48 at its input and outputting the integrated, or DC average, value of the pulse train 48. The output of integrator 50 is coupled to the inverting or − input terminal of a first comparator 52 and to the non-inverting or + input terminal of a second comparator 54. An upper reference voltage, corresponding to a maximum controllable light intensity, is generated at a point 56 of a voltage divider 58 which is coupled between a DC voltage +V and ground potential. Point 56 is coupled to the − input terminal of comparator 54. A lower reference voltage, corresponding to a minimum controllable light intensity, is generated at a point 60 of voltage divider 58. Point 60 is coupled to the + input terminal of comparator 52.

The outputs of comparators 52, 54 are signals representative of the control range of the light intensity control feedback loop of the present invention. If the signal at the output of integrator 50 is not within the range determined by the voltage levels at points 56 and 60, the operator must adjust the intensity of the light output of emitter 40 to attempt to get the emitter output light within the control range of the system.

Figure 2:
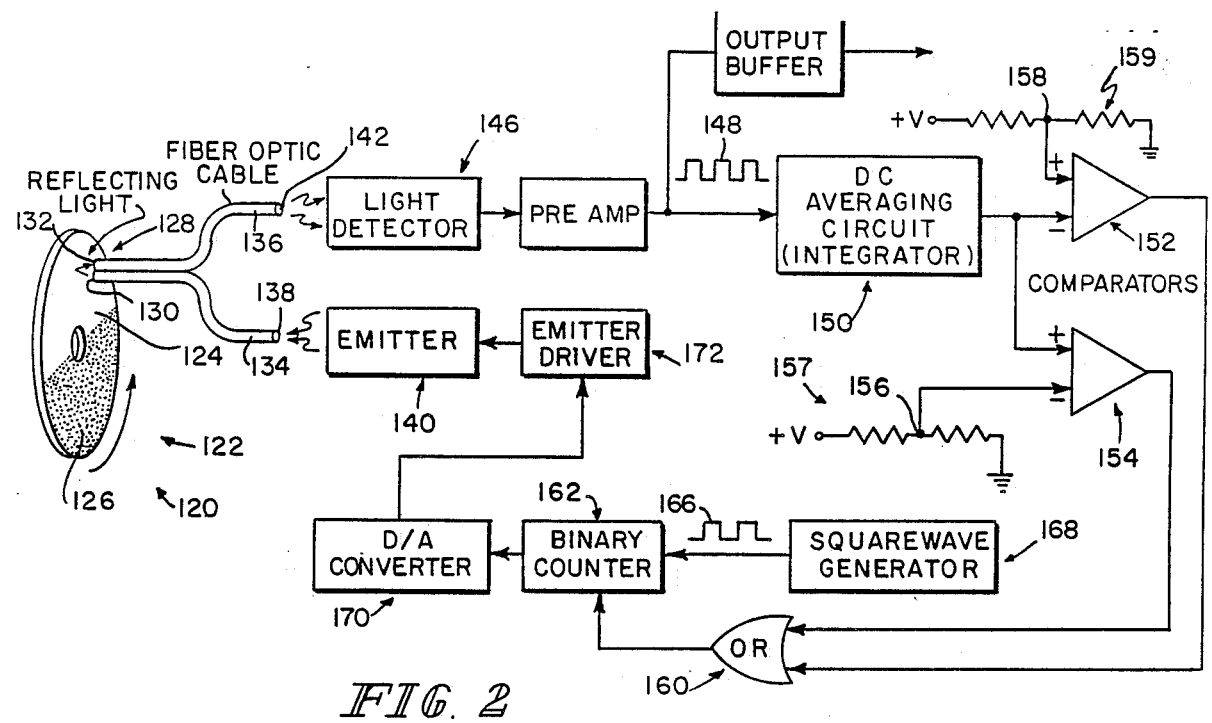
FIG. 2 illustrates a block diagram of a system constructed according to the present invention.

Referring to FIG. 2, a rotary atomizer motor of the type illustrated in British Patent Specification No. 2,068,150 or 2,068,152 includes a rotary element 120, such as a turbine wheel, one surface 122 of which is provided with a specular segment 124 and a non-specular segment 126. As the element 120 is rotated by the motor, the specular and non-specular elements 124, 126 are alternately presented before a fiber optic cable head 128 which includes an end 130, 132 of each of two fiber optic cables 134, 136, respectively. Cable 134 extends from its other end 138 adjacent a variable intensity light emitter 140 to its end 130, transmitting light from emitter 140 to surface 122. Cable 136 extends from end 132 to its other end 142 adjacent a light detector 146. Cable 136 transmits pulses back to light detector 146 when specular segment 124 is beneath head 128. When non-specular segment 126 is beneath head 128, of course, no light pulses are transmitted back. The light detector 146 converts these light pulses into an electrical pulse train 148 which is further processed as discussed in British Patent Specification Nos. 2,068,150 and 2,068,152 to provide closed-loop control of the motor speed.

An integrator 150 functions as a DC averaging circuit, receiving the electrical pulse train 148 at its input and outputting the integrated, or DC average, value of the pulse train 148. The output of integrator 150 is coupled to the inverting or − input terminal of a first comparator 152 and to the non-inverting or + input terminal of a second comparator 154. An upper reference voltage, corresponding to a maximum controllable light intensity, is generated at a point 156 of a voltage divider 157 coupled between a DC voltage +V and ground potential. Point 156 is coupled to the − input terminal of comparator 154. A lower reference voltage, corresponding to a minimum controllable light intensity, is generated at a point 158 of a voltage divider 159 which is coupled across +V to ground. Point 158 is coupled to the + input terminal of comparator 152.

As previously discussed, it is important for the purpose of providing as broad a control range as possible for the closed loop speed control, to increase the adaptability of the system to fluctuating intensity of the light signal received at light detector 146. Otherwise, under certain conditions within the tolerance limits of the equipment used in the circuit realization of the speed control loop, the threshold sensitivity of the light detector 146 may not be reached by the received light pulse train. Under certain other conditions, the received light may be enough to saturate the light detector 146 under all conditions so that no light pulse train is detected by it. Of course, under either of these conditions, in prior art systems there could be no control of motor speed, since no electrical pulse train 148 relating to actual motor speed could be generated.

The outputs of comparators 152, 154 are signals representative of the control range of the light intensity control feedback loop of the present invention. If the signal at the output of integrator 150 is not within the range determined by the voltage levels at points 156, 158, control of the output light intensity of emitter 140 is passed, under the control strategy of the present system, to an alternative control mechanism. The output signals from comparators 152, 154 are coupled to inputs of an OR gate 160, the output of which controls a binary counter 162. The presence of a high, or logic "1", condition on the output of OR gate 160 disables binary counter 162. The output squarewave pulse train 166 of a squarewave generator 168, which serves as a clock or time base generator for the inventive system, is coupled to an input of binary counter 162. When binary counter 162 is enabled, it counts the pulses of pulse train 166 and generates the binary equivalent of a "staircase" signal at the output of binary counter 162. This is converted into an analog staircase signal which approximates a ramp signal at the output of a digital-to-analog (D/A) converter 170 to which binary counter 162 is coupled. This ramp signal is coupled through an emitter driver 172 which cycles the output light intensity of emitter 140 through a ramp of increasing intensity as the closed loop output light intensity control hunts for an output light intensity within the control range established by potentiometers 156, 158.

Figure 3:
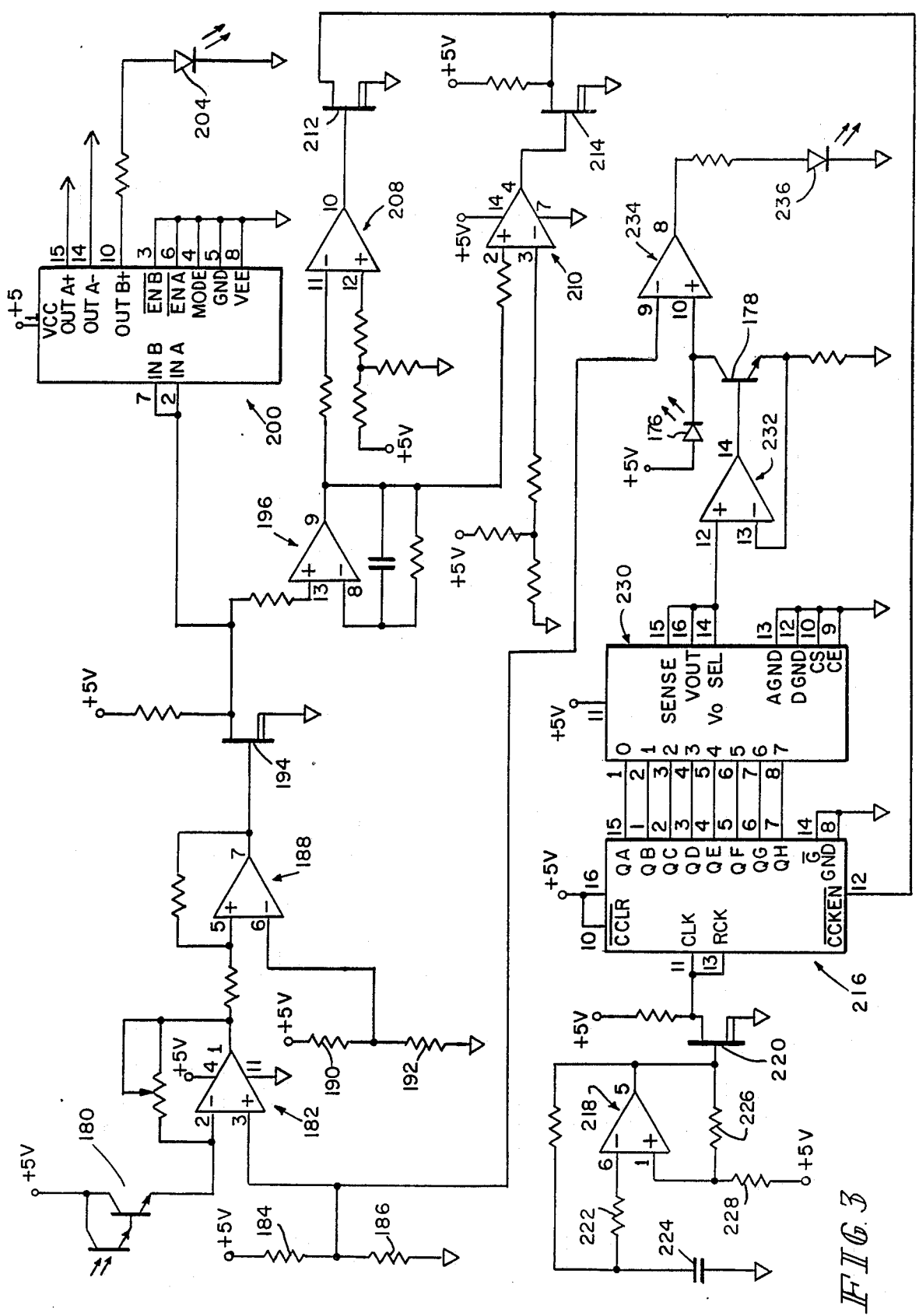
FIG. 3 illustrates a more detailed partly block and partly schematic diagram of the system illustrated in FIG. 2.

FIG. 3 illustrates a partly block and partly schematic circuit realization of portions of the block diagram of FIG. 2. An infrared light emitting diode 176 is coupled between +5 VDC and the collector of a driver transistor 178. Infrared radiation from diode 176 is transmitted through fiber optic cable 134 (FIG. 2), shone on surface 122, intermittently received in end 132 of fiber optic cable 136, and transmitted back along cable 136 to light detector Darlington phototransistor pair 180. The D+ terminal of pair 180 is coupled to +5 VDC. Its D− terminal is coupled to the − input terminal of a difference amplifier 182. The output terminal of difference amplifier 182 is coupled through a feedback potentiometer to its − input terminal. The + input terminal of amplifier 182 is maintained at +2.5 VDC through two 10K resistors 184, 186 in series voltage divider configuration between +5 VDC and ground. The output terminal of difference amplifier 182 is coupled through a series resistor to the + input terminal of a difference amplifier 188. The − input terminal of difference amplifier 188 is maintained at +2 VDC through a series voltage divider including a resistor 190 and a resistor 192 coupled between +5 VDC and ground. A feedback resistor is coupled between the output terminal of difference amplifier 188 and its + input terminal. Difference amplifier 188 illustratively is a type 324 integrated circuit. The pin numbers indicated on amplifier 188 and on the remaining integrated circuit components mentioned in this discussion are the pin numbers which can be used if those specific integrated circuits are employed in the circuit realization of the block diagram of FIG. 2. However, other integrated circuits can be used in the realization, and no loss of generality or limitation in the scope of protection afforded by this patent is intended. The output terminal of difference amplifier 188 is also coupled to the gate electrode of an FET 194. The source of FET 194 is coupled to ground. Its drain is coupled through a load resistor to +5 VDC, through a resistor to the + input terminal of a difference amplifier 196, and to input terminals, pins 2 and 7, of a feedback buffer integrated circuit 200. Difference amplifier 196 illustratively is a type 3900 integrated circuit. Circuit 200 illustratively is a type 26LS30 integrated circuit.

Active circuit components 182, 188 and 194 and their associated passive components generally form the preamplifier of FIG. 2. Integrated circuit 200 and its associated components generally comprise the output buffer of FIG. 2. The feedback pulse train corresponding to motor speed is available across output terminals A+, A− of circuit 200. A lighted indicator LED 204, the cathode of which is coupled to ground and the anode of which is coupled through a 220 ohm series resistor to the B+ output terminal of circuit 200, indicates the presence of the feedback pulse train.

The output terminal of difference amplifier 196 is coupled through a parallel RC circuit including a 470K resistor and a 0.1 μF capacitor to its − input terminal. Difference amplifier 196 and its associated passive components in this configuration provide the integrator of FIG. 2. The output terminal of difference amplifier 196 is also coupled through a series resistor to the − input terminal of a low intensity limit comparator difference amplifier 208, and through a series resistor to the + input terminal of a high intensity limit comparator difference amplifier 210. The + input terminal of difference amplifier 208 is maintained at approximately +1 VDC by coupling it through a series resistor to a resistive voltage divider coupled between +5 VDC and ground. The − input terminal of difference amplifier 210 is maintained at approximately +3.8 VDC by coupling it through a series resistor to a resistive voltage divider coupled between +5 VDC and ground. Difference amplifiers 208, 210 illustratively are type 3900 integrated circuits.

The output terminals of difference amplifiers 208, 210 are coupled to the gates of respective FETs 212, 214. These gates correspond to the input terminals of the OR gate of FIG. 2. The sources of both FETs 212 and 214 are coupled to ground. The drains of both FETs 212 and 214 are coupled through a single load resistor to +5 VDC and to the CCKEN terminal of an eight bit counter integrated circuit 216. Integrated circuit 216 illustratively is a type 74HC590 integrated circuit, and corresponds to the binary counter of FIG. 2.

A squarewave generator including a difference amplifier 218 and an FET 220 supplies the time base generating squarewave to the CLK and RCK terminals of integrated circuit 216. The − input terminal of difference amplifier 218 is coupled through a 2.7 M resistor 222 and a 0.1 μF capacitor 224 to ground. The junction of resistor 222 and capacitor 224 is coupled through a 27K feedback resistor to the output terminal of difference amplifier 218. The output terminal of difference amplifier 218 is coupled through two series 10 M resistors 226, 228 to +5 VDC. The junction of resistors 226, 228 is coupled to the + input terminal of difference amplifier 218. The output terminal of difference amplifier 218 is coupled to the gate of FET 220. The source of FET 220 is coupled to ground. The drain of FET 220 is coupled directly to the CLK and RCK terminals of integrated circuit 216 and through a load resistor to +5 VDC. Difference amplifier 218 illustratively is a type 3900 integrated circuit.

The QA–QH output terminals of integrated circuit 216 are coupled to the 0–7 input terminals, respectively, of an integrated circuit D/A converter 230 which corresponds to the D/A converter of FIG. 2. D/A converter 230 illustratively is a type AD558 integrated circuit. The SENSE, VOUT and SEL output terminals of D/A converter 230 are coupled to the + input terminal of an emitter driver difference amplifier 232. The output terminal of difference amplifier 232 is coupled to the base of emitter driver transistor 178. The emitter terminal of transistor 178 is coupled to the − input terminal of difference amplifier 232 and through a feedback resistor to ground. The collector of transistor 178 is also coupled to the + input terminal of a difference amplifier 234. The − input terminal of difference amplifier 234 is coupled to the +2.5 VDC supply at the + input terminal of difference amplifier 182. The output terminal of difference amplifier 234 is coupled through a resistor and an indicator LED 236 to ground. When infrared emitter 176 is emitting infrared radiation, LED 236 indicates this by emitting light. Difference amplifiers 232, 234 illustratively are type 324 difference amplifiers.

What is claimed is:

1. An output control for a light source, the light source being responsive to an input electrical signal to increase or decrease its output depending upon whether the input electrical signal corresponds to a higher light output level than the source is currently providing or a lower light output level than the source is currently providing, respectively, the gain control comprising first means for monitoring the light output and for producing a signal related thereto, second means for establishing a maximum desired light output, third means for establishing a minimum desired light output, fourth means for comparing the first means signal to the maximum and minimum desired light outputs, means for coupling the first, second, and third means to the fourth means, fifth means for selectively generating a periodic signal, means for coupling the fourth means to the fifth means, and means for coupling the fifth means to the light source, the fifth means providing the periodic signal as the input electrical signal to the light source in response to the fourth means determining that the first means signal is not related to a light output between the maximum desired light output and the minimum desired light output.

2. The apparatus of claim 1 and further comprising a motor, an element rotated by the motor, means for coupling light from the light source to the element, and means for coupling signals from the element to the first means, the signals coupled from the element to the first means being related to the rate of rotation of the element.

3. The apparatus of claim 2 wherein the element comprises a rotor rotated by the motor, the rotor having a specular region and a non-specular region, the means for coupling light from the light source to the element comprising a first optical waveguide having a first end positioned adjacent the light source for receiving light output therefrom and a second end positioned adjacent the element, and the means for coupling signals from the element to the first means comprises a second optical waveguide having a first end positioned adjacent the element and a second end positioned adjacent the first means.

4. The apparatus of claim 1 wherein the first means comprises a light detector.

5. The apparatus of claim 4 wherein the first means further comprises an amplifier comprising an input, the light detector having an output, and means for coupling the light detector output to the amplifier input.

6. The apparatus of claim 5 wherein the first means comprises an integrator having an input, the amplifier having an output, and means for coupling the amplifier output to the integrator input.

7. The apparatus of claim 6 wherein the fourth means comprises a first comparator having two inputs, the means for coupling the second means to the fourth means comprises means for coupling the second means to one input of the first comparator, the integrator having an output, and the means for coupling the first means to the fourth means comprises means for coupling the output of the integrator to the other input of the first comparator.

8. The apparatus of claim 7 wherein the fourth means comprises a second comparator having two inputs, the means for coupling the third means to the fourth means comprises means for coupling the third means to one input of the second comparator, and the means for coupling the first means to the fourth means further comprises means for coupling the output of the integrator to the other input of the second comparator.

9. The apparatus of claim 8 wherein each of the first and second comparators comprises an output, the fifth means comprises an OR gate having two inputs, and the means for coupling the fourth means to the fifth means comprises means for coupling the first comparator output to one of the inputs of the OR gate and the second comparator output to the other of the inputs of the OR gate.

10. The apparatus of claim 9 wherein the fifth means further comprises a time base generator having an output, a counter having an input, an output, and a disabling terminal, and a digital-to-analog (D/A) converter having an input and an output, the OR gate including an output, means for coupling the output of the OR gate to the disabling terminal of the counter, means for coupling the output of the time base generator to the input of the counter, means for coupling the output of the counter to the input of the D/A converter, and the means for coupling the fifth means to the light source comprises means for coupling the output of the D/A converter to the light source.

11. The apparatus of claim 10 wherein the fifth means further comprises a light source driver having an input and an output, the means for coupling the output of the D/A converter to the light source comprising means for coupling the output of the D/A converter to the input of the light source driver, the light source driver providing the input electrical signal to the light source, and the means for coupling the fifth means to the light source comprises means for coupling the output of the light source driver to the light source.

12. The apparatus of claim 1 wherein the fourth means comprises a first comparator having two inputs, the means for coupling the second means to the fourth means comprises means for coupling the second means to one input of the first comparator, and the means for coupling the first means to the fourth means comprises means for coupling the first means to the other input of the first comparator.

13. The apparatus of claim 1 wherein the fourth means comprises a comparator having two inputs, means for coupling the third means to one input of the comparator, and the means for coupling the first means to the fourth means comprises means for coupling the first means to the other input of the comparator.

* * * * *